(12) United States Patent
Rouille

(10) Patent No.: US 10,293,694 B2
(45) Date of Patent: May 21, 2019

(54) SYSTEM FOR CONVERTING ELECTRIC ENERGY, ELECTRIC ENERGY STORAGE DEVICE AND POWER TRAIN FOR A RAILWAY VEHICLE

(71) Applicant: ALSTOM TRANSPORT TECHNOLOGIES, Saint-Ouen (FR)

(72) Inventor: Bruno Rouille, Ordizan (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/457,057

(22) Filed: Mar. 13, 2017

(65) Prior Publication Data

US 2017/0267112 A1 Sep. 21, 2017

(30) Foreign Application Priority Data

Mar. 16, 2016 (FR) ...................................... 16 52232

(51) Int. Cl.
*B60L 11/18* (2006.01)
*H02J 7/00* (2006.01)
(Continued)

(52) U.S. Cl.
CPC ....... *B60L 11/1811* (2013.01); *B60L 11/1803* (2013.01); *B60L 11/1875* (2013.01);
(Continued)

(58) Field of Classification Search
CPC . B60L 11/1811; B60L 2200/26; H02J 7/0052; H02J 7/0068; H02J 2007/0059
See application file for complete search history.

(56) References Cited

U.S. PATENT DOCUMENTS 5,633,577 A    5/1997  Matsumae et al.
6,724,175 B1 * 4/2004  Matsuda ............... H02M 3/156
                                                     323/224
(Continued)

FOREIGN PATENT DOCUMENTS

EP    2 927 046 A2   10/2015
JP    2007/187248 A   7/2007
WO    2008/000978 A2  1/2008

OTHER PUBLICATIONS

John M. Miller et al.: "Battery and ultracapacitor combinations—where should the converter go?", Vehicle Power and Propulsion Conference (VPPC), 2010 IEEE, IEEE. Sep. 1, 2010, pp. 1-7, XP031929352.

(Continued)

*Primary Examiner* — Daniel Kessie
(74) *Attorney, Agent, or Firm* — Young & Thompson

(57) ABSTRACT

This conversion system for converting electric energy is intended to be connected to a load, and includes the connection terminals, that are capable of being connected to the load, an electric energy converter, and a filter including at least one capacitor. This conversion system for converting electric energy additionally also includes a switching module configured in order to switch between a first configuration in which the filter is connected between the converter and the connection terminals and a second configuration in which the converter is connected directly to the connection terminals, with the filter being bypassed.

8 Claims, 2 Drawing Sheets

(51) Int. Cl.
*H02M 1/14* (2006.01)
*H02M 3/158* (2006.01)
*H02J 7/02* (2016.01)

(52) U.S. Cl.
CPC .......... *H02J 7/0034* (2013.01); *H02J 7/0052* (2013.01); *H02J 7/0068* (2013.01); *H02J 7/022* (2013.01); *H02M 1/14* (2013.01); *H02M 3/158* (2013.01); *B60L 2200/26* (2013.01); *H02J 2007/0059* (2013.01); *Y02T 10/7005* (2013.01); *Y02T 10/705* (2013.01); *Y02T 10/7072* (2013.01); *Y02T 10/92* (2013.01); *Y02T 90/127* (2013.01); *Y02T 90/14* (2013.01)

(56) References Cited

U.S. PATENT DOCUMENTS

| | | | |
|---|---|---|---|
| 8,963,456 B2 * | 2/2015 | Sugiura | B60L 7/16 307/10.1 |
| 9,362,781 B2 * | 6/2016 | Costa | H02J 9/00 |
| 2008/0191677 A1 * | 8/2008 | Bacchi | H02M 3/156 323/282 |
| 2010/0019737 A1 | 1/2010 | Leboeuf | |
| 2011/0273155 A1 * | 11/2011 | Weir | H02M 3/156 323/283 |
| 2012/0021263 A1 | 1/2012 | Nishi et al. | |
| 2013/0181682 A1 | 7/2013 | Yoshioka et al. | |
| 2013/0271084 A1 | 10/2013 | Kitanaka et al. | |
| 2015/0022928 A1 * | 1/2015 | Mohaddes Khorassani | H02H 3/087 361/93.7 |
| 2015/0115703 A1 * | 4/2015 | Hatanaka | B61C 3/02 307/9.1 |

OTHER PUBLICATIONS

FR Search Report, dated Nov. 24, 2016, from corresponding FR application.

* cited by examiner

SYSTEM FOR CONVERTING ELECTRIC ENERGY, ELECTRIC ENERGY STORAGE DEVICE AND POWER TRAIN FOR A RAILWAY VEHICLE

FIELD OF THE INVENTION

The present invention relates to a conversion system for converting electric energy that is intended to be connected to a load.

BACKGROUND OF THE INVENTION

The conversion system includes connection terminals capable of being connected to the load, an electric energy converter, and a filter comprising at least one capacitor.

The invention also relates to an electric energy storage device, intended to be installed on-board in a railway vehicle, with the device comprising an electric battery and such a conversion system for converting electric energy connected to the battery.

The invention also relates to a power train for a railway vehicle, the power train comprising an electric motor and such an electric energy storage device.

The invention relates to the field of power supply systems for supplying power to a transport vehicle, such as a railway vehicle, in particular a rail-bound electric traction vehicle with a power train. The electric power is supplied from an electrical connection, such as a catenary or overhead line, and the power train additionally also includes a power storage device for storing electrical energy by way of a complementary source of energy when the power train is no longer being supplied with power by the electrical connection.

DESCRIPTION OF THE RELATED APPLICATION

The document US 2013/0271084 A1 describes a conversion system for converting electric energy of the abovementioned type. The conversion system for converting electric energy includes a converter for converting a direct current voltage into another direct current voltage for the charging and discharging of an energy storage unit, such as an electric battery. The converter is a step-down voltage converter. The conversion system also includes a filter capacitor connected upstream of the converter and a filter coil connected downstream of the converter, between the converter and the energy storage unit. The filter coil is used to filter the oscillations of the voltage supplied to the energy storage unit by the converter operating as a step-up chopper.

However, the filter coil generally has significantly large dimensions, in order to provide adequate filtering so as to ensure the charging of the energy storage unit with the required current quality, which further increases the volume and the cost of such an energy conversion system.

SUMMARY OF THE INVENTION

The object of the invention is thus to provide a conversion system for converting electric energy that presents a reduced dimensional footprint, while also providing for adequate filtering so as to ensure the charging of the energy storage unit with the required current quality.

To this end, the goal of the invention is to provide a conversion system for converting electric energy that is intended to be connected to a load, the conversion system for converting electric energy including:
  connection terminals that are capable of being connected to the load;
  an electric energy converter; and
  a filter comprising at least one capacitor; and
  a switching module configured in order to switch between a first configuration in which the filter is connected between the converter and the connection terminals and a second configuration in which the converter is connected to the terminals, with the filter being bypassed.

The conversion system for converting electric energy according to the invention provides the ability, in the first configuration, to reduce the oscillations in the voltage delivered to the load due to the connection of the filter between the converter and the connection terminals, and in the second configuration, makes it possible to reheat the load or to improve the flow rate on the load by suppressing the filtering, the converter being connected to the connection terminals and the filter being by-passed, the suppression of the filtering making it possible for example to increase the waves resulting from the converter. In other words, in the second configuration, the converter is connected directly to the connection terminals, and the filter is not used, the filter in the second configuration being isolated from the converter and the connection terminals.

According to other advantageous aspects, the invention includes one or more of the following characteristic features, taken into consideration in isolation or in accordance with any technically possible combination:
  the switching module includes a first switch connected in series with the filter, and a second switch connected in parallel with the filter and with the first switch connected in series, the first switch being closed in the first configuration and open in the second configuration, and the second switch being open in the first configuration and closed in the second configuration;
  the filter additionally also includes an electromagnetic coil;
  the filter additionally also includes an electrical resistor;
  the load is an electric battery; and
    the switching module is in the first configuration during the charging of a battery, in order to reduce the waves, resulting from the converter, in a voltage delivered to the battery; and
    the switching module is in the second configuration during the discharging of the battery or during the reheating of the battery;
  the converter is a chopper;
  the converter is a step-down chopper in the first configuration and a step-up chopper in the second configuration;
  the conversion system for converting electric energy additionally also includes a protection diode connected between the converter and the connection terminals, the protection diode being configured so as to protect the converter against a reversal of voltage from the load.

The object of the invention also relates to an electric energy storage device, intended to be installed on-board in a railway vehicle, with the device comprising an electric battery and a conversion system for converting electric energy connected to the battery, the conversion system for converting electric energy being as defined here above.

The object of the invention also relates to a power train for a railway vehicle, the power train comprising an electric motor and an electric energy storage device, the electrical energy storage device being as defined above.

BRIEF DESCRIPTION OF THE DRAWINGS

These characteristic features and advantages of the invention will become apparent upon reading the description that follows, provided only by way of non-limiting example, and with reference being made to the attached drawings, in which.

DETAILED DESCRIPTION OF THE INVENTION

Figure 1:
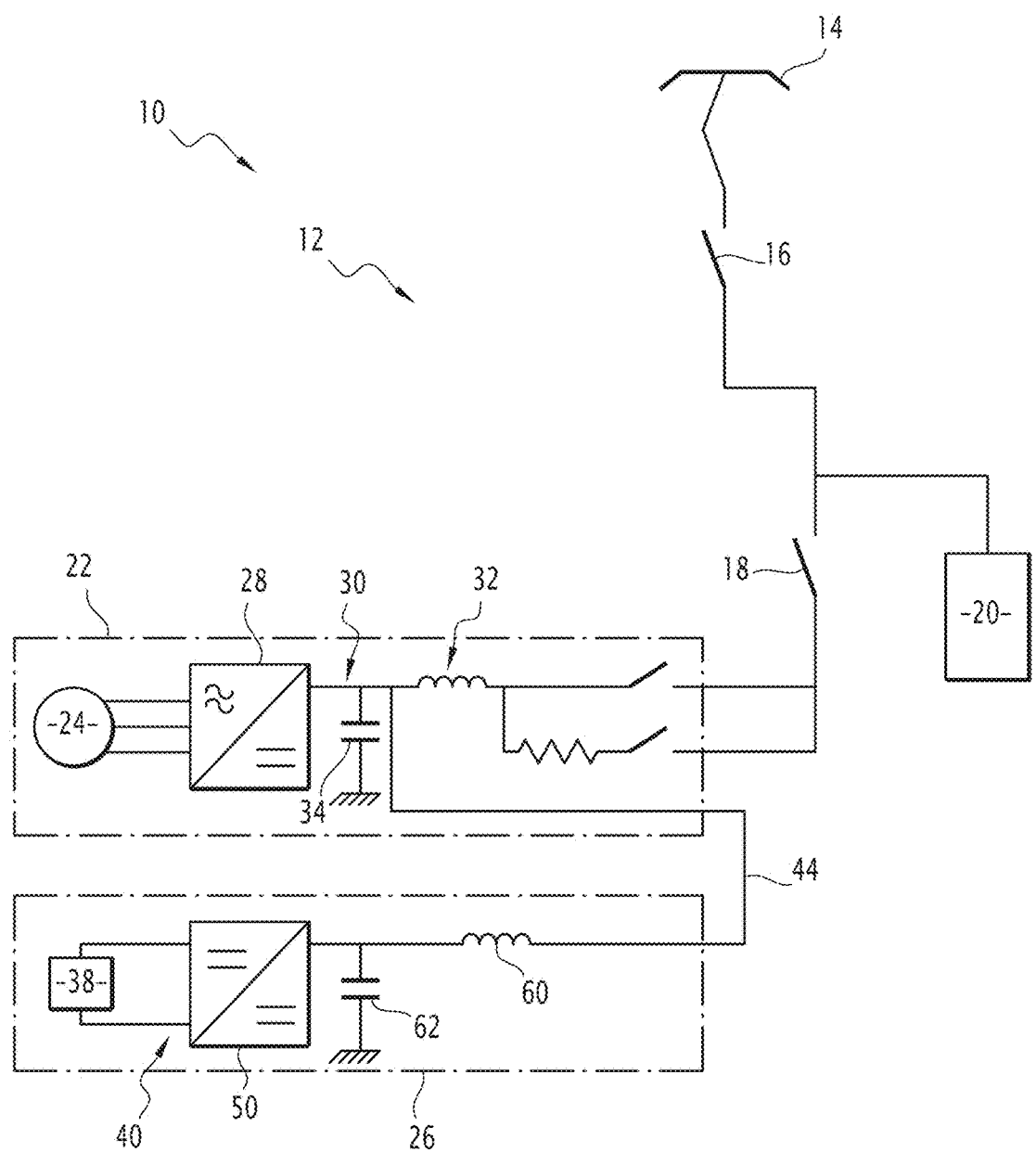
FIG. 1 is a schematic representation of a railway vehicle including a power train, the power train comprising an electric motor and an electric energy storage device.

In FIG. 1, a railway vehicle 10 includes a power train 12, the power train comprising a pantograph 14 that is capable of being connected to a catenary, which is not shown.

The power train 12 includes an electrical switch 16 connected to the pantograph 14 and an electrical circuit breaker 18 connected to the electrical switch 16. The power train 12 includes, by way of an optional addition, an auxiliary equipment unit 20 connected between the electrical switch 16 and the electrical circuit breaker 18, so as to bypass the electrical circuit breaker 18.

The power train 12 additionally also includes a traction assembly 22 that comprises an electric motor, 24 and an electric energy storage device 26, the electric energy storage device 26 also being referred to as an autonomous power box.

The electrical switch 16, the electrical circuit breaker 18 and the auxiliary equipment unit 20 are known per se, and shall not be described in a more detailed manner. The auxiliary equipment unit 20 for example is a static converter.

The traction assembly 22 is connected to the electrical circuit breaker 18 and the electric energy storage device 26 is connected to the traction assembly 22.

The traction assembly 22 consists of the electric motor 24, an inverter 28 designed to deliver a voltage to the electric motor 24 from the direct current voltage 24 originating from a continuous bus 18 connected to the electrical circuit breaker 30.

In addition, the traction assembly 22 includes a filtering device 32, comprising in particular, a filtering capacitor 34.

The electric motor 24 is an alternative motor, for example a three-phase motor.

The electric energy storage device 26 is intended to be installed on-board in the railway vehicle 10, and includes an electric battery 38 and a conversion system for converting electric energy 40 connected to the battery 38.

Figure 2:
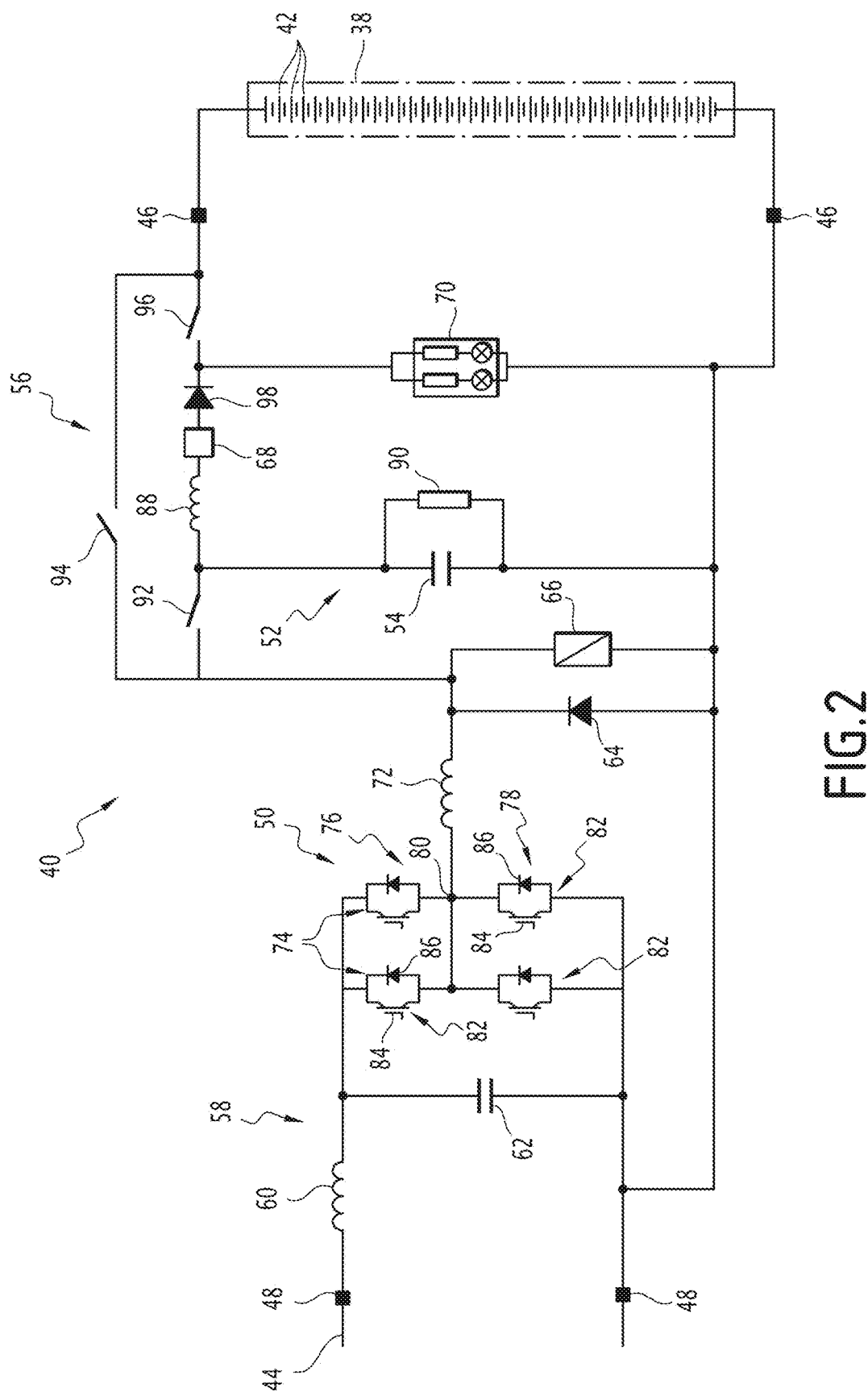
FIG. 2 is a schematic representation of the electric energy storage device shown in FIG. 1.

For example, the electric battery 38 is constituted of a stack of electrical energy storage unitary elements 42, as represented in FIG. 2.

The conversion system for converting electric energy 40 is intended to be connected, on the one hand, to a load, such as the electric battery 38, and on the other hand, to a source of electrical energy, such as the continuous bus 30, by means of an electrical connection 44.

The conversion system for converting electric energy 40 includes the first connection terminals 46, that are capable of being connected to the load, such as the electric battery, 38, of the second connection terminals 48 that are capable of being connected to the power source, such as the continuous bus 30, an electric energy converter 50 and a filter 52 comprising a first capacitor 54, as represented in FIG. 2.

The conversion system for converting electric energy 40 additionally also includes a switching module 56 configured in order to switch between a first configuration in which the filter 52 is connected between the converter 50 and the first connection terminals 46, and a second configuration in which the converter 50 is connected to the first connection terminals 46 with the filter 52 thus then being by-passed.

By way of an optional addition, the conversion system for converting electric energy 40 includes a filtering device 58 arranged between the converter 50 and the second connection terminals 48. The filtering device 58 for example is an LC (inductor and capacitor) filter, comprising a first electromagnetic coil 60 and a second capacitor 62 connected to the connection terminals of the converter 50 on the side of the power source.

By way of an optional addition, the conversion system for converting electric energy 40 moreover also includes a protection diode 64 (or safety diode) connected between the converter 50 and the first connection terminals 46, the protection diode 64 being configured in order to protect the converter 50 against a reversal of voltage from the load.

The conversion system for converting electric energy 40 includes a voltage sensor 66 configured in order to measure a value of the voltage originating from the converter 50 in the direction of the first connection terminals 46. The voltage sensor 66 is for example connected in parallel with the protection diode 64.

The conversion system for converting electric energy 40 in addition also includes a current sensor 68 configured in order to measure a value of the intensity of the current delivered to the first connection terminals 46 when the switching module 56 is in the first configuration and the filter 52 is thus then connected between the converter 50 and the first connection terminals 46.

By way of an optional addition, the conversion system for converting electric energy 40 includes a voltage presence indicator light 70 configured in order to indicate the presence of a voltage between the first connection terminals 46 when the switching module 56 is in the first configuration. This voltage presence indicator light 70 makes it possible in particular to verify the absence of a residual voltage in the first capacitor 54 during a maintenance operation.

The converter 50 for example is a chopper configured in order to convert a direct current voltage into another direct current voltage.

In the example shown in FIG. 2, the converter 50 is configured in order to operate as a step-down voltage converter when the current flows from the second connection terminals 48 in the direction of the first connection terminals 46. Conversely, the converter 50 is configured in order to operate as a step-up voltage converter when the current flows from the first connection terminals 46 in the direction of the second connection terminals 48. In other words, when the load is the battery 38, the converter 50 is configured in order to operate as a step-down voltage converter during the charging of the battery 38, and to operate as a step-up voltage converter during the discharge of the battery 38.

The converter 50 is known per se. The converter 50 includes, for example, a second electromagnetic coil 72 connected to the protection diode 64, and at least one switching arm 74, each switching arm comprising an upper half arm 76 and a lower half arm 78. The upper half arm 76 is connected between one of the second connection terminals 48 corresponding to the positive potential of the direct current voltage and a center tap 80, and the lower half arm 78 is connected between the other of the second connection terminals 48 and the center tap 80. The second electromagnetic coil 72 is connected between the center tap 80 and the protection diode 64.

In the example shown in FIG. 2, the converter 50 includes two switching arms 74 connected in parallel so as to ensure the conversion of a current of higher power. As it is known per se, each half arm 76, 78 includes at least one bi-directional switch 82, formed for example by a transistor 84 and a free-wheeling diode 86 connected in anti-parallel with the transistor 84.

The filter 52 comprises at least one capacitor, such as the first capacitor 54. The filter 52 also includes at least one electromagnetic coil, such as a third electromagnetic coil 88. The filter 52 includes in addition at least one electrical resistor 90. This electrical resistor 90 makes it possible to discharge the first capacitor 54 in the second configuration, in particular in order to enable the securing of the maintenance operations.

In the example shown in FIG. 2, the first capacitor 54 is connected between the first connection terminals 46, that is to say, in parallel with the load, such as the electric battery 38, when it is connected to the first connection terminals 46. The third electromagnetic coil 88 is connected between the center tap 80 and the first connection terminal 46 corresponding to the center tap 80. The electrical resistor 90 is for example connected in parallel with the first capacitor 54.

The switching module 56 includes, in the example shown in FIG. 2, a first switch 92 connected in series with the filter 52, and a second switch 94 connected in parallel with the filter 52 and with the first switch 92 connected in series, the first switch 92 being closed in the first configuration and open in the second configuration, and the second switch 94 being open in the first configuration and closed in the second configuration.

By way of an optional addition, the switching module 56 includes a third switch 96 connected in series with the filter 52 and with the first switch 92, the third switch 96 being closed in the first configuration and open in the second configuration. By way of an optional addition, the switching module 56 additionally also includes a diode 98 connected in series with the filter 52, between the first switch 92 and the third switch 96.

When the load is the electric battery 38, at the time of a charge, or charging, of the battery 38, the switching module 56 is switched into the first configuration so as to reduce the waves, resulting from the converter 50, in the voltage delivered to the battery 38.

During the reheating of the battery 38, the switching module 56 is switched into the second configuration in order to increase the waves resulting from the converter 50.

During the discharge of the battery 38, the switching module 56 is also in the second configuration, which makes possible the flow of a current of higher intensity that does not pass through the filter 52, the filter 52 being suitably dimensioned for currents of lower intensity.

Thus, in the first configuration, the filter 52 is connected between the converter 50 and the first connection terminals 46, and the filter 52 makes it possible to reduce the oscillations in the voltage delivered to the load.

In the example shown in FIG. 2 where the switching module 56 includes the first, second and third switches 92, 94, 96, the first configuration corresponds to the closing of the first and third switches 92, 96 and the opening of the second switch 94.

In the second configuration, the current flows directly between the converter 50 and the first connection terminals 46 without passing through the filter 52, the filter 52 thus then not being used in this second configuration.

In the example shown in FIG. 2 where the switching module includes the first, second and third switches 92, 94, 96, the second configuration corresponds to the closing of the second switch 94 and to the opening of the first and third switches 92, 96.

The converter 50 operates in step-down voltage mode in order to recharge the battery 38, for example in the braking phase for braking the transport vehicle. When the converter 50 operates in step-down voltage mode, the switching module 56 is commanded into the first configuration, so as to ensure that the filter 52 attenuates the waves of current present in the voltage originating from the converter 50, that is to say, in order to provide adequate filtering so as to ensure the charge of the battery 38 with the required current quality.

When the converter 50 operates in step-up voltage mode, that is to say, when the current flows from the first connection terminals 46 to the second connection terminals 48, the switching module 56 is commanded into the second configuration that is used either for the reheating of the battery 38, or for the discharge of the battery 38. The current waves created by the converter operating in step-up voltage mode are thus then used for preheating the battery 38. During the discharge of the battery 38, the second configuration makes it possible to not cause the flow of the current through the filter 52, and thus allows the flow of a current of higher intensity, the filter 52 being suitably dimensioned only for low intensity currents.

The current oscillations created by the converter 50 during the reheating of the battery are preferably oscillations around an average value that is close to zero in order to minimise the consumption of energy provided by the battery 38. The rate of increase in the temperature of the battery 38 is proportional to the effective value of the current and its frequency. During the reheating of the battery 38, the power consumed is then substantially null, the current waves having a current with average value being substantially null, while also having a non-null effective value. The amplitude of the current waves is liable to be increased by reducing the switching frequency of the converter 50.

By way of example, a reheating of the order of 2.5° C./minute is achieved with a current having an amplitude of the order of 200 amps. The person skilled in the art would obviously understand that these values are given purely by way of an indication, and depend both on the technology of the battery 38 and on the number of the electric energy storage unitary elements 42 of which it is composed.

It may thus be conceived that the conversion system for converting electric energy 40 according to the invention provides the ability both to reduce the current oscillations in the voltage delivered to the load, especially when the load is an electrical energy storage unit, with the filter 52 then making it possible to ensure charging of the said electric energy storage unit with a satisfactory quality of current, and also by suppressing the filtering in the second configuration, making it possible to reheat the load with an increase in the waves resulting from the converter 50, or to improve the flow rate in the load with the circulation of a current of higher intensity that does not pass through the filter 52.

The conversion system for converting electric energy 40 thus then, on account of the switching module 56, effectively provides for the ability to switch between the first and second configurations offering complementary respective operating modes, while also having a compact dimensional footprint as compared to the conversion system for converting electric energy known in the state of the art.

The invention claimed is:

1. A conversion system for converting electric energy, the conversion system for converting electric energy comprising:
   connection terminals configured to be connected to a load;
   an electric energy converter;
   a filter comprising at least one capacitor;
   a switching module configured to switch between a first configuration in which the filter is connected between the electric energy converter and the connection terminals and a second configuration in which the electric energy converter is connected to the connection terminals, with the filter being bypassed, the switching module including a first switch connected in series with the filter, and a second switch connected in parallel with the filter and with the first switch connected in series, the first switch being closed in the first configuration and open in the second configuration, and the second switch being open in the first configuration and closed in the second configuration; and
   a protection diode connected between the electric energy converter and the connection terminals, the protection diode being configured to protect back flow of current from the load to the electric energy converter,
   wherein the filter is configured to reduce oscillations in voltage delivered to the load.

2. The conversion system for converting electric energy according to claim 1, wherein the filter also includes an electromagnetic coil.

3. The conversion system for converting electric energy according to claim 1, wherein the filter also includes an electrical resistor.

4. The conversion system for converting electric energy according to claim 1, wherein the load is an electric battery,
   the switching module is in the first configuration during the charging of a battery, in order to reduce the waves, resulting from the converter, in a voltage delivered to the electric battery, and
   the switching module is in the second configuration during the discharging of the battery or during the heating of the battery.

5. The conversion system for converting electric energy according to claim 1, wherein the converter is a chopper.

6. The conversion system for converting electric energy according to claim 5, wherein the converter is a step-down chopper in the first configuration and a step-up chopper in the second configuration.

7. An electric energy storage device, configured to be installed on-board in a railway vehicle, the electrical energy storage device comprising:
   an electric battery; and
   the conversion system for converting electric energy according to claim 1, the conversion system being connected to the electric battery.

8. A power train for a railway vehicle, the power train comprising:
   an electric motor; and
   the electric energy storage device according to claim 7.

* * * * *